(12) United States Patent
Weekamp et al.

(10) Patent No.: US 7,499,222 B2
(45) Date of Patent: *Mar. 3, 2009

(54) METHOD OF MANUFACTURING A COLLECTION OF SEPARATE VARIABLE FOCUS LENSES

(75) Inventors: Johannus Wilhelmus Weekamp, Eindhoven (NL); Stein Kuiper, Eindhoven (NL); Bernardus Hendrikus Wilhelmus Hendriks, Eindhoven (NL); Arjen Gerben Van Der Sijde, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 361 days.

This patent is subject to a terminal disclaimer.

(21) Appl. No.: 10/555,600
(22) PCT Filed: May 6, 2004
(86) PCT No.: PCT/IB2004/050607
§ 371 (c)(1),
(2), (4) Date: Nov. 4, 2005
(87) PCT Pub. No.: WO2004/099829
PCT Pub. Date: Nov. 18, 2004

(65) Prior Publication Data
US 2007/0141738 A1 Jun. 21, 2007

(30) Foreign Application Priority Data
May 9, 2003 (EP) .................................. 03076428
Oct. 10, 2003 (EP) .................................. 03103759

(51) Int. Cl.
*G02B 1/06* (2006.01)
*G02B 15/14* (2006.01)

(52) U.S. Cl. ...................................... 359/666; 359/676
(58) Field of Classification Search ................. 359/665, 359/666, 667, 676
See application file for complete search history.

(56) References Cited

U.S. PATENT DOCUMENTS

| 2001/0017985 A1 | 8/2001 | Tsuboi et al. | |
|---|---|---|---|
| 2006/0285220 A1 * | 12/2006 | Van As et al. | ............... 359/665 |

FOREIGN PATENT DOCUMENTS

| EP | 1293807 A1 | | 3/2003 |
|---|---|---|---|
| JP | 2002169005 | | 6/2002 |
| JP | 2002169005 A | * | 6/2002 |
| WO | 02099527 A1 | | 12/2002 |
| WO | 03069380 A1 | | 8/2003 |

* cited by examiner

*Primary Examiner*—Scott J Sugarman

(57) ABSTRACT

A method of manufacturing a collection of variable focus lenses comprising two electrodes (21, 22) and a fluid chamber filled with two fluids which are separated by a meniscus, wherein the shape of the meniscus is variable under the influence of a voltage, comprises the following steps: providing an electrically insulating body (60) having a plurality of through-holes (14, 65); applying electrically conducting material to a surface of the body (60) in order to obtain the electrodes (21, 22); covering at least one of the obtained electrodes (21, 22) by a layer of electrically insulating material; covering an inner surface of a part of the through-holes (14) with a hydrophobic material; partially sealing these through-holes (14); arranging the fluids inside the partially sealed through-holes (14); completely sealing the through-holes (14); and dividing the body (60) into portions, such that each portion constitutes a complete lens.

19 Claims, 4 Drawing Sheets

METHOD OF MANUFACTURING A COLLECTION OF SEPARATE VARIABLE FOCUS LENSES

The present invention relates to a method of manufacturing a collection of separate variable focus lenses, wherein $n \geq 2$ and each variable focus lens comprises the following components: an electrically insulating member in which a through-hole is arranged for providing a light path through the electrically insulating member, which through-hole is sealed by means of covers which are optically transparent in the light path; a fluid chamber which is enclosed by an inner surface of the through-hole and the covers, and which is filled with a first fluid and a second fluid, which are non-miscible, and which are in contact over a meniscus; and a first electrode and a second electrode, wherein a shape of the meniscus is variable under the application of a voltage between the first electrode and the second electrode.

Variable focus lenses are known in which light is refracted by a meniscus between two fluids, wherein the shape of the meniscus is variable under the influence of a voltage. In general, such variable focus lenses comprise an electrically insulating member having two end surfaces and a circumferential surface extending between the end surfaces. The electrically insulating member is provided with a through-hole extending between the end surfaces, which through-hole serves for letting through light. The through-hole is sealed at both ends, whereby a sealed fluid chamber for containing the fluids is obtained. One of the fluids, which is referred to as the first fluid, has electrically insulating properties, whereas another of the fluids, which is referred to as the second fluid, has electrically conducting properties. The fluids are non-miscible, and tend to form two fluid bodies separated by a meniscus. Functionally, the fluids have different indices of refraction.

For the purpose of applying a voltage, the variable focus lenses comprise two electrodes. A first electrode is separated from the second fluid, whereas a second electrode is in direct contact with the second fluid, or is capacitively coupled thereto.

WO 03/069380 discloses a variable focus lens in which an inner surface of the through-hole is covered by a hydrophobic fluid contact layer. When no voltage is applied, the wettability of the fluid contact layer with respect to the first fluid differs from the wettability of the fluid contact layer with respect to the second fluid. Due to an effect referred to as electrowetting, the wettability of the fluid contact layer with respect to the second fluid is variable under the application of a voltage between the first electrode and the second electrode. A change of the wettability of the fluid contact layer leads to a change of a contact angle of the meniscus at a line of contact between the fluid contact layer and the two fluids, whereby the shape of the meniscus is adjusted. Hence, the shape of the meniscus is dependent on the applied voltage.

According to the state of the art, variable focus lenses of the type as described in the foregoing are manufactured individually. During a first step of the manufacturing process, the electrically insulating member is provided, whereas during subsequent steps, the other elements of the variable focus lens are provided and connected to the electrically insulating member, and the electrically insulating member is provided with the two fluids.

An important disadvantage of the fact that the known variable focus lenses are manufactured individually is that it involves the risk of individual lenses not being completely identical, and consequently perhaps having different properties. Furthermore, this way of manufacturing the variable focus lenses is troublesome, especially when the fact that the dimensions of these lenses are usually in the millimeter range is taken into account.

It is an object of the present invention to provide a method which is suitable to be applied for manufacturing more than one variable focus lens at a time, so that reproducibility may be improved and manufacturing costs may be reduced. This object is achieved by a method of manufacturing a collection of n separate variable focus lenses, wherein $n \geq 2$; each variable focus lens comprising the following components: an electrically insulating member in which a through-hole is arranged for providing a light path through the electrically insulating member, which through-hole is sealed by means of covers which are optically transparent in the light path; a fluid chamber which is enclosed by an inner surface of the through-hole and the covers, and which is filled with a first fluid and a second fluid, which are non-miscible, and which are in contact over a meniscus; and a first electrode and a second electrode, wherein a shape of the meniscus is variable under the application of a voltage between the first electrode and the second electrode; the method comprising the following steps:

providing an electrically insulating body, which is provided with at least through-holes, wherein a part of a surface of the electrically insulating body is covered with electrically conducting material;

covering a part of the electrically conducting material with an electrically insulating material;

partially sealing n through-holes;

filling the n partially sealed through-holes with the first fluid and the second fluid;

completely sealing the n through-holes; and dividing the electrically insulating body into n portions.

The method according to the present invention is aimed at manufacturing a number of variable focus lenses simultaneously. For this purpose, an electrically insulating body is applied, which comprises a plurality of through-holes, at least a portion of which is intended to constitute through-holes of individual variable focus lenses to be manufactured. A surface of the electrically insulating body is covered with electrically conducting material, which electrically conducting material is shaped and positioned such as to constitute the first electrode and the second electrode of the individual variable focus lenses to be manufactured. At least the portions of electrically conducting material which are destined to constitute the first electrode are entirely or partly covered by an electrically insulating material.

The method according to the present invention further comprises the step of partially sealing the through-holes, which step may be performed prior to or subsequent to the step of applying the layer of electrically insulating material. As a result of partially sealing the through-holes, partially sealed fluid chambers for receiving and containing the fluids are formed. Subsequent steps of the method according to the present invention comprise filling the fluid chambers with the fluids, and closing the fluid chambers completely.

After the steps are performed of applying the electrically insulating layer, forming the fluid chambers, filling the fluid chambers with the fluids, and completely sealing the fluid chambers, the electrically insulating body obtained may be regarded as an array of variable focus lenses, wherein the lenses are attached to each other. In order to obtain separate variable focus lenses, the last step in the manufacturing process according to the present invention involves dividing the electrically insulating body into portions. It will be understood that each portion constitutes a complete variable focus lens, comprising two electrodes and a fluid chamber filled with fluids.

A variable focus lens which is manufactured under the application of the method according to the present invention comprises an electrically insulating member, which is to be regarded as a portion of the former electrically insulating body. Normally, the surface of the electrically insulating body comprises two end surfaces, wherein the through holes extend between these two end surfaces. Consequently, the electrically insulating member of the individual variable focus lens also has two end surfaces. Furthermore, the electrically insulating member comprises a circumferential surface interconnecting the two end surfaces. During the manufacturing process, the complete circumferential surface of the variable focus lens is obtained only after the step of dividing the electrically insulating body has been performed.

An insight underlying the present invention is that there is no need for protrusions extending from the circumferential surface of the electrically insulating member to connect the electrodes to a power supply. Instead, each electrode may for example be contacted at an end surface of the electrically insulating member. Therefore, it is possible to manufacture a plurality of variable focus lenses from one single electrically insulating body, wherein during a last step of the manufacturing process, the body is divided.

In a preferred way of carrying out the method according to the present invention, the electrically insulating body comprises n+z through-holes; wherein at least a part of an inner surface of each of z through-holes is covered by the electrically conducting material; and wherein the z through-holes are divided into at least two hole portions when the step of dividing the electrically insulating body into n portions is performed.

If the method is carried out in the way as described in the preceding paragraph, the n through-holes remain intact during the step of dividing the electrically insulating body, whereas the z through-holes are divided. Normally, like the n through-holes, the z through-holes extend between the two end surfaces of the electrically insulating body. Consequently, after the step of dividing the electrically insulating body into n portions has been performed, during which the z through-holes are divided into at least two hole portions, the hole portions have become part of the circumferential surface of the electrically insulating member of the variable focus lens obtained.

It is possible to connect the electrically conducting material of the inner surface of the z through-holes to the rest of the electrically conducting material in such a way that after division of the electrically insulating body, the electrically conducting material covering one hole portion is part of one obtained electrode. Advantageously, the value of z and the position of the z through-holes is chosen such that the circumferential surface of each variable focus lens obtained comprises two hole portions, wherein the electrically conducting material of one of the hole portions is part of the first electrode, and wherein the electrically conducting material of another of the hole portions is part of the second electrode. Such a design of the variable focus lens offers the possibility of contacting the electrodes at the circumferential surface. Thus, according to the present invention, despite the fact that the complete circumferential surface is obtained only after the step of dividing the electrically insulating body has been performed, it is possible to let the electrodes partially cover the circumferential surface.

In another preferred way of carrying out the method according to the present invention, covers are applied for the purpose of sealing the n through-holes, which covers are at least partially flexible. In this way, it is possible to obtain variable focus lenses in which the volume of the fluid chamber is variable. This is very advantageous, as in such variable focus lenses, adjustments of a volume of the fluid chamber to a volume of the fluids may be performed automatically, so that the pressure inside the fluid chamber may remain more or less at the same level. Variation of the volume of the fluids may occur during operation of the variable focus lens, for example under the influence of the temperature. If the variation of the volume of the fluids is not compensated for, the operation of the variable focus lens is influenced by this variation, or breaking of the covers may occur.

In yet another preferred way of carrying out the method according to the present invention, an inner surface of the fluid chambers is covered with a hydrophobic material, especially in case the electrically insulating layer is not capable of acting as a hydrophobic layer as well. By forming a fluid contact layer having good hydrophobic qualities, it is ensured that the wettability of the fluid contact layer with respect to the second fluid is variable under the application of a voltage, so that the variable focus lenses obtained are able to function in the prescribed manner.

The present invention will now be explained in greater detail with reference to the figures, in which like parts are indicated by like reference signs, and in which:

FIG. 1 shows a perspective view of a variable focus lens according to a first preferred embodiment of the present invention, wherein a quarter of the lens is broken away;

FIG. 2 diagrammatically shows a cross section of the lens as shown in FIG. 1;

Figure 1:
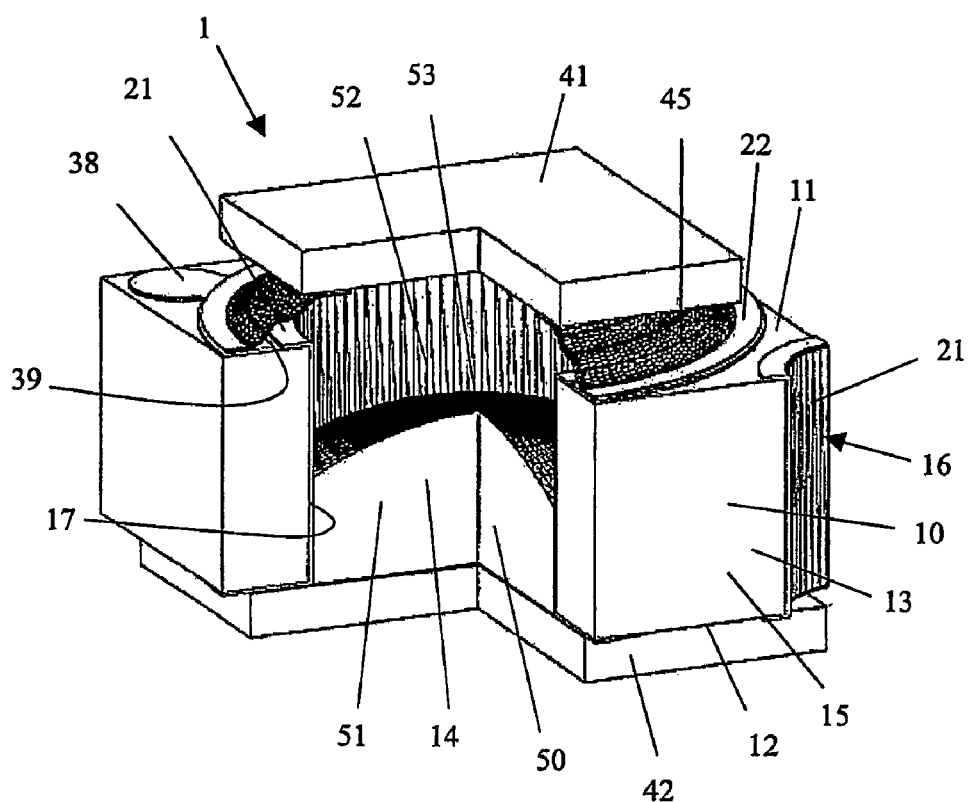
Figure 6:
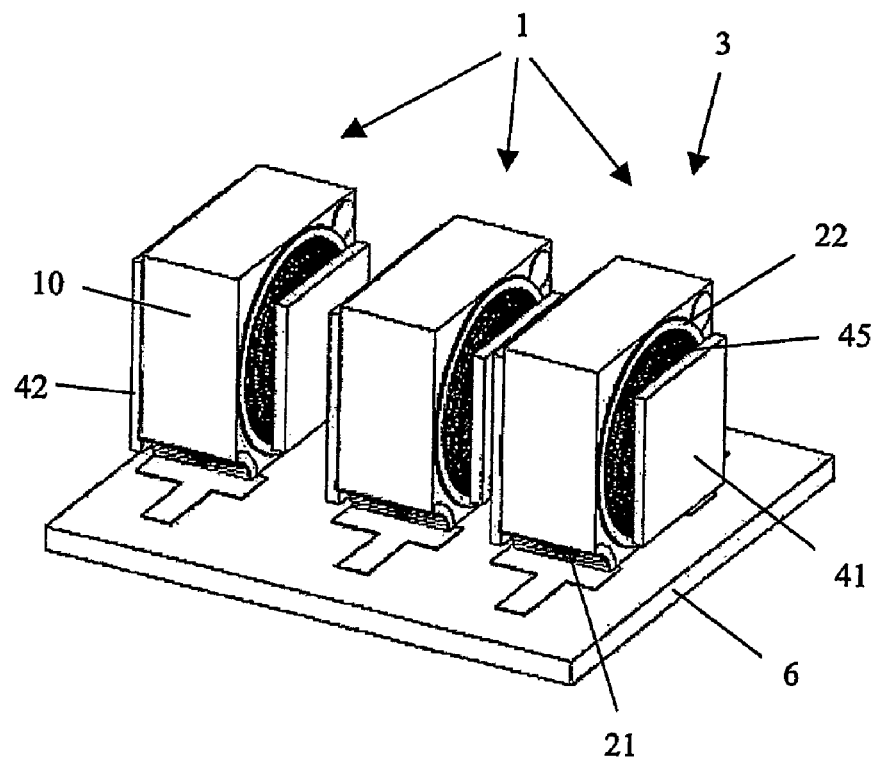
Figure 7:
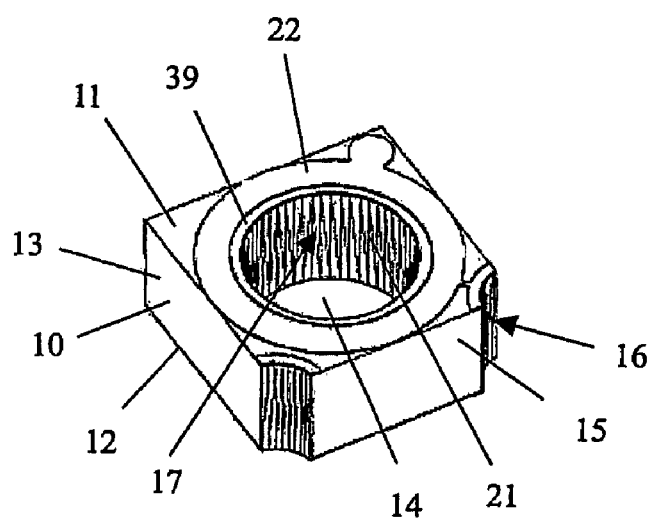
Figure 8:
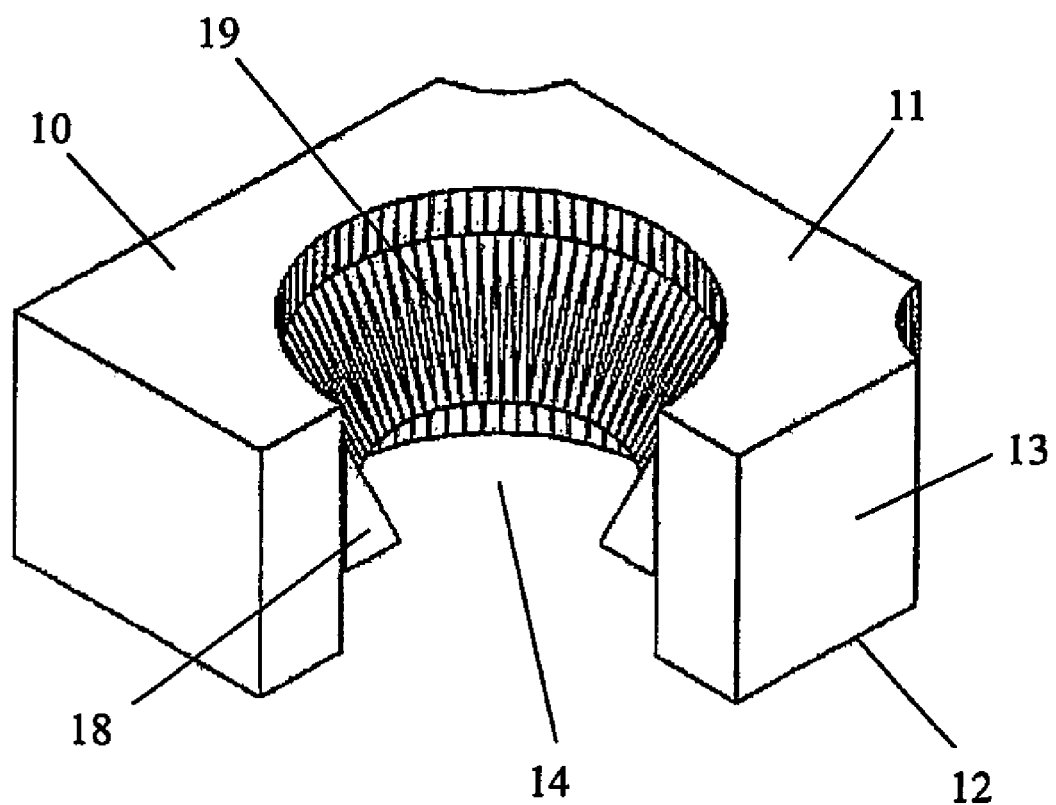

FIG. 6 diagrammatically shows a lens assembly, comprising three variable focus lenses as shown in FIG. 1;

FIG. 7 shows a perspective top view of an electrically insulating member covered with electrodes, which is part of a variable focus lens according to a second preferred embodiment of the present invention; and FIG. 8 shows a perspective view of an electrically insulating member of a lens according to the present invention and an insert, wherein a quarter of the electrically insulating member and the insert are broken away.

Figure 2:
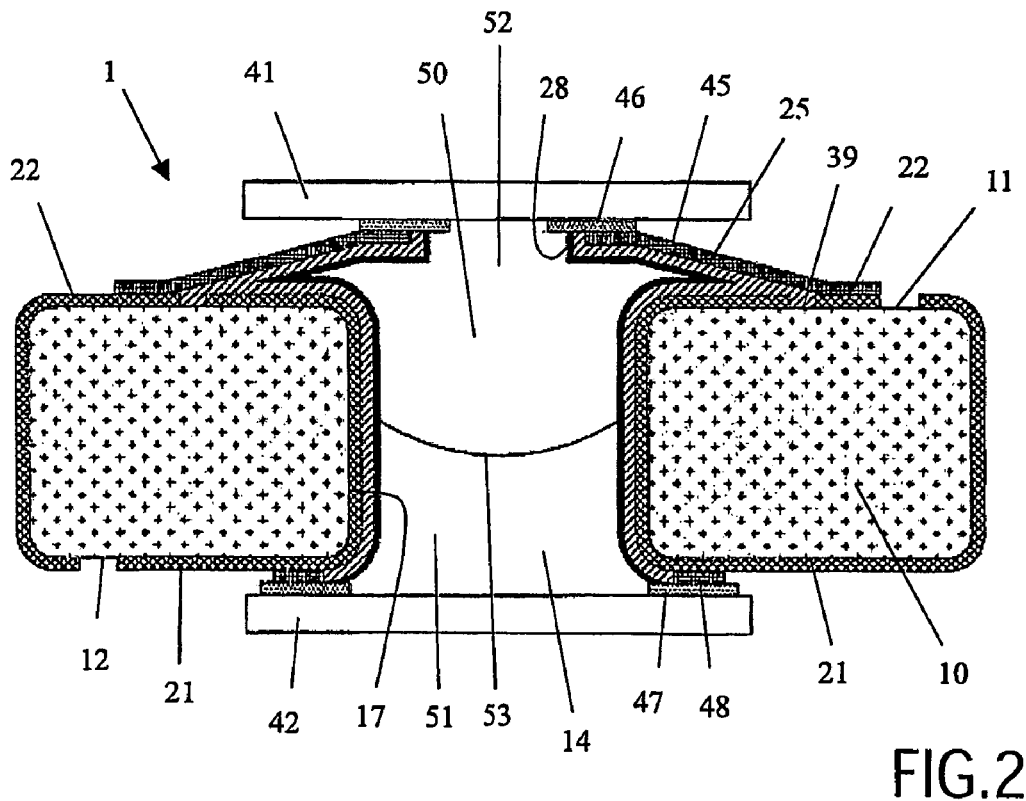
Figure 3:
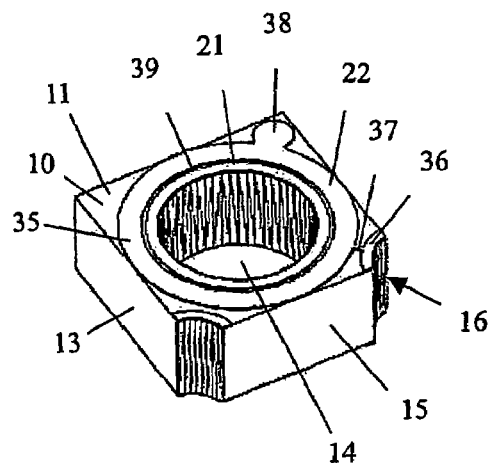
FIG. 3 shows a perspective top view of an electrically insulating member covered with electrodes, which is part of the lens as shown in FIG. 1.
Figure 4:
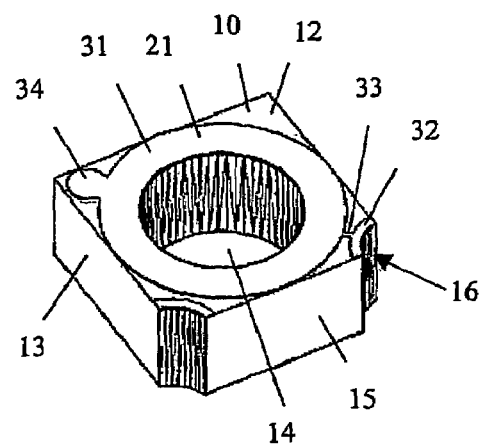
FIG. 4 shows a perspective bottom view of the electrically insulating member as shown in FIG. 3.

FIGS. 1 and 2 show a variable focus lens 1 according to a first preferred embodiment of the present invention. In FIG. 1, for the sake of clarity, a quarter of the lens 1 is broken away. FIGS. 3 and 4 show an electrically insulating member 10 covered with electrodes 21, 22, which is part of the lens 1.

The electrically insulating member 10 has a first end surface 11, an opposite second end surface 12 and a circumferential surface 13 extending between the first end surface 11 and the second end surface 12. The electrically insulating member 10 is provided with a through-hole 14 extending between the first end surface 11 and the second end surface 12. In the example shown, the through-hole 14 is shaped as a cylinder having a circular transverse section. Further, in the example shown, the circumferential surface 13 comprises four rectangular flat surfaces 15 and two concave surfaces 16, wherein each concave surface 16 extends between two flat surfaces 15. In FIG. 1, only one concave surface 16 is shown, as the other concave surface 16 is part of the quarter that is broken away.

The lens 1 comprises a first electrode 21 and a second electrode 22, which are both applied to the surface of the electrically insulating member 10 as a layer comprising an electrically conducting material, for example gold plated copper.

The first electrode 21 covers a part of the first end surface 11, an inner surface 17 of the electrically insulating member 10 defining the through-hole 14, a part of the second end surface 12, and one concave surface 16. The portion of the first electrode 21 arranged on the first end surface 11 is shaped as a ring encompassing a first end of the through-hole 14. The portion of the first electrode 21 arranged on the second end surface 12 may be subdivided into four sub-portions 31, 32, 33, 34, wherein a first sub-portion 31 is shaped as a ring encompassing a second end of the through-hole 14, a second sub-portion 32 is shaped as a quarter ring encompassing a bottom side of the concave surface 16, a third sub-portion 33 is shaped as a narrow straight path interconnecting the first sub-portion 31 and the second sub-portion 32, and a fourth sub-portion 34 is shaped as a bulge of the first sub-portion 31.

The second electrode 22 covers a part of the first end surface 11, and one of the concave surfaces 16, i.e. the concave surface 16 that is not covered by the first electrode 21. Like the portion of the first electrode 21 arranged on the second end surface 12, the portion of the second electrode 22 arranged on the first end surface 11 may be subdivided into four sub-portions 35, 36, 37, 38, wherein a first sub-portion 35 is shaped as a ring encompassing the first electrode 21, a second sub-portion 36 is shaped as a quarter ring encompassing an upper side of the concave surface 16, a third sub-portion 37 is shaped as a narrow straight path interconnecting the first sub-portion 35 and the second sub-portion 36, and a fourth sub-portion 38 is shaped as a bulge of the first sub-portion 35.

It will be understood that the first electrode 21 and the second electrode 22 do not contact each other on the electrically insulating member 10. Consequently, on the first end surface 11, the second electrode 22 encompasses the first electrode 21 at a distance, so that a part 39 of the first end surface 11 shaped as a ring is left uncovered.

The second end of the through-hole 14 is covered by an optically transparent second cover plate 42. In the example shown, the second cover plate 42 has a rectangular shape, wherein the dimensions of the second cover plate 42 are such that it is capable of covering the second end surface 12 completely. The second cover plate 42 may for example comprise glass.

On the side of the first end surface 11, the lens 1 comprises an optically transparent first cover plate 41 and a spacer 45, wherein a top portion of the spacer 45 is attached to the first cover plate 41, and wherein a bottom portion of the spacer 45 is attached to the second electrode 22.

In the example shown, the spacer 45 comprises a flexible foil having a three-dimensional structure or a stepped structure which contributes to the flexibility of the spacer. Preferably, the foil comprises an electrically conducting material, and the connection between the spacer 45 and the second electrode 22 is realized by means of solder, so that the second electrode 22 is functionally elongated by means of the spacer 45. However, it is also possible for the foil to comprise another material, and for alternatives such as glue or the like to be used for the purpose of connecting the spacer 45 to the second electrode 22.

Further, in the example shown, the first cover plate 41 has a rectangular shape, wherein the dimensions of the first cover plate 41 are such that an open top end of the spacer 45 is completely sealed. Like the second cover plate 42, the first cover plate 41 may for example comprise glass.

Preferably, the first cover plate 41 and the second cover plate 42 are attached to the top portion of the spacer 45 and the portion of the first electrode 21 arranged on the second end surface 12, respectively, by means of soldering. For this purpose, the first cover plate 41 may for example comprise a metal ring, which serves as a connection means between the first cover plate 41 and the spacer 45. The second cover plate 42 may also comprise a metal ring, which serves as a connection means between the second cover plate 42 and the first electrode 21. In FIG. 2, a cross section is shown of two annular portions of solder 46, 47, wherein a first portion of solder 46 is present between the first cover plate 41 and the spacer 45, and a second portion of solder 47 is present between the second cover plate 42 and the first electrode 21. Further, in FIG. 2, a cross section is shown of a solder ring 48, which is present between the second portion of solder 47 and the first electrode 21.

Advantageously, at least one of the cover plates 41, 42 of the lens 1 is shaped as a lens, i.e. at least one of the cover plates 41, 42 comprises a convex or a concave surface. In this way, a default focus of the lens 1 is obtained.

In the following, the space provided by the through-hole 14, which at a first end is sealed by means of the first cover plate 41 and the spacer 45, and which at a second end is sealed by means of the second cover plate 42, is referred to as fluid chamber 50.

As is illustrated by FIG. 2, a portion of the first electrode 21 inside the fluid chamber 50 and an under portion of the spacer 45 are completely covered with an insulating layer 25 comprising parylene or another suitable insulating material. Further, it is disclosed that the insulating layer 25 is completely covered with a fluid contact layer 28 comprising a hydrophobic material.

Inside the fluid chamber 50, two fluids 51, 52 are present, which are non-miscible, and which are in contact over a meniscus 53. A first fluid 51, which is present at a lower portion of the fluid chamber 50, is a silicone oil, an alkane or another suitable electrically insulating fluid. A second fluid 52, which is present at an upper portion of the fluid chamber 50, is water containing a salt solution or another suitable electrically conducting fluid. Functionally, the fluids 51, 52 have different indices of refraction.

Preferably, the densities of the two fluids 51, 52 are equal, so that the operation of the lens 1 is not influenced by its orientation, in other words, so that the operation of the lens 1 is not influenced by gravitational effects between the two fluids 51, 52.

As the second fluid 52 is present at an upper portion of the fluid chamber 50, and the first portion of solder 46 is not covered by any layer, the second electrode 22 acts in an indirect manner on the second fluid 52, through said portion of solder 46, wherein the second electrode 22 and said portion of solder 46 are interconnected by means of the spacer 45. When no voltage is applied between the first electrode 21 and the second electrode 22, the wettability of the fluid contact layer 28 with respect to the first fluid 51 differs from the wettability of the fluid contact layer 28 with respect to the second fluid 52. Due to an effect referred to as electrowetting, the wettability of the fluid contact layer 28 with respect to the second fluid 52 is variable under the application of a voltage between the first electrode 21 and the second electrode 22. A change of the wettability of the fluid contact layer 28 leads to a change of a contact angle of the meniscus 53 at a line of contact between the fluid contact layer 28 and the two fluids 51, 52, whereby the shape of the meniscus 53 is adjusted. Hence, the shape of the meniscus 53 is dependent on the applied voltage, and the lens 1 may be used as a variable focus lens, as the meniscus 53 serves for refracting light.

In an alternative embodiment of the variable focus lens according to the present invention, the fluid contact layer 28 may be omitted, for example in case of the insulating layer 25 having hydrophobic properties which are sufficient for a proper functioning of the variable focus lens. Further, the spacer 45 may contact the second fluid 52 directly. Therefore, it is not necessary for the under portion of the spacer 45 to be covered by the layers 25, 28.

Figure 5:
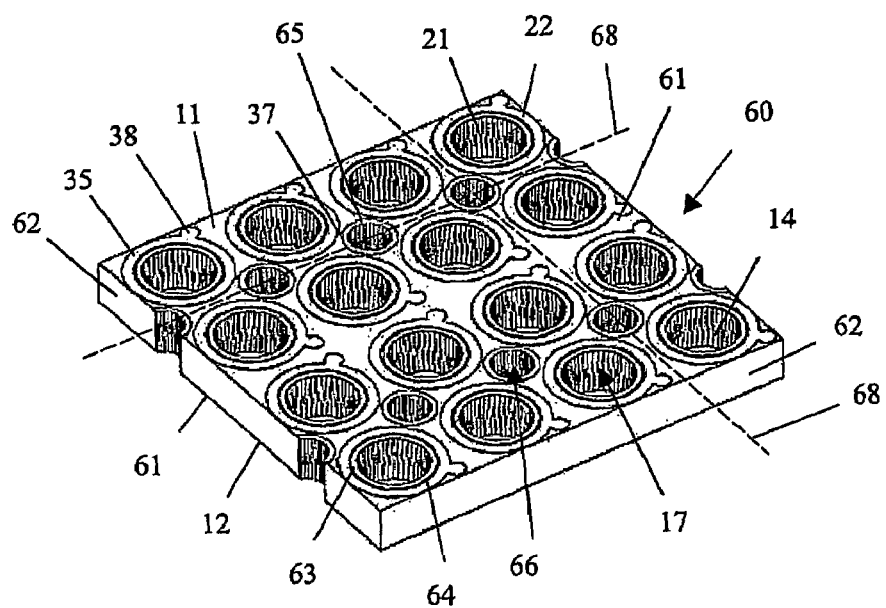
FIG. 5 shows a perspective top view of an electrically insulating body, which constitutes an intermediate product in a manufacturing process of the lens as shown in FIG. 1.

FIG. 5 shows a perspective top view of an electrically insulating body 60, which constitutes an intermediate product in a manufacturing process of the lens 1. In the figure, the electrically insulating body 60 is shown in a state in which electrically conducting material for forming the electrodes 21, 22 has already been applied to its surface.

The electrically insulating body 60 is shaped as a rectangular slice having two parallel main body surfaces 61 and four side surfaces 62 interconnecting the main body surfaces. In the following, one of the main body surfaces 61 will be referred to as first end surface 11, whereas another of the main body surfaces 61 will be referred to as second end surface 12.

In the example as shown, the electrically insulating body 60 is provided with sixteen through-holes 14 which are intended to constitute the through-hole 14 of the separate lenses 1 to be manufactured from the body 60. Hence, it is intended to obtain sixteen lenses 1 by means of the electrically insulating body 60. Further, the electrically insulating body 60 is provided with ten through-holes 65, quarters of which are intended to constitute the concave surfaces 16 of the separate lenses 1 to be manufactured from the body. In practical cases, a diameter of the through-holes 14 of the electrically insulating body 60 for forming the through-hole 14 of the lens 1 is larger than a diameter of the through-holes 65 of the electrically insulating body 60 for forming the concave surfaces 16 of the lens 1, in accordance with that which is shown in FIG. 5. For the sake of clarity, the through-holes 14 for forming the through-hole 14 of the lens 1 will hereinafter be referred to as large through-holes 14, whereas the through-holes 65 for forming the concave surfaces 16 of the lens 1 will hereinafter be referred to as small through-holes 65.

In the electrically insulating body 60, both the large through-holes 14 and the small through-holes 65 extend between the first end surface 11 and the second end surface 12 of the body 60, wherein a longitudinal axis of the through-holes 14, 65 extends substantially perpendicular to the end surfaces 11, 12.

The electrically insulating body 60 may comprise any suitable type of insulating material, including organic and inorganic materials. Preferably, the insulating material comprises a polymer resin, so that the body resembles bodies as generally used in printed circuit boards. Thus, the body and the electrodes may be manufactured using the conventional manufacturing technology available for printed circuit boards. For example, a suitable material for the electrically insulating body 60 is material which is commonly known as FR-4.

In the following, a preferred way in which the lenses 1 are manufactured on the basis of the electrically insulating body 60 is described.

As described in the foregoing, the electrically insulating body 60 comprises a plurality of through-holes 14, 65, wherein two groups of through-holes may be distinguished, i.e. a group of large through-holes 14 and a group of small through-holes 65. The large through-holes 14 and the small through-holes 65 are positioned with respect to each other in such a way that each large through-hole 14 is surrounded by exactly two small through-holes 65.

The through-holes 14, 65 may be arranged in the electrically insulating body 60 in any suitable way, for example by means of drilling. It is also possible that the electrically insulating body 60 is provided by means of for example injection moulding, wherein the through-holes 14, 65 are already arranged during the injection moulding process, and do not need to be arranged afterwards by means of a separate process for removing material from the electrically insulating body 60.

Initially, electrically conducting material is applied to a surface of the electrically insulating body 60. The layer of electrically conducting material is shaped such that several types of portions of electrically conducting material are distinguishable, wherein each type of portion has its own shape. Each portion of the electrically conducting material is intended to constitute a part of the two electrodes 21, 22 of the separate variable focus lenses 1 to be manufactured. A first type of portions 63 of the electrically conducting material, which is intended to be part of the first electrode 21, is laid down on the electrically insulating body 60 in such a way that each of these portions 63 covers a part of the first end surface 11, a surface 17 of a large through-hole 14, and a part of the second end surface 12. At the first end surface 11, the portions 63 are shaped as rings encompassing the large through-holes 14. At the second end surface 12, the portions 63 are shaped as rings 31 encompassing the through-holes 14, wherein a bulge 34 is arranged at an outer circumference of the rings 31. Furthermore, a second type of portions 64 of the electrically conducting material, which is intended to be part of the second electrode 22, is laid down on the electrically insulating body 60 in such a way that each of these portions 64 covers a part of the first end surface 11. The portions 64 are shaped as rings 35 encompassing the rings of the first type of portions 63, wherein a bulge 38 is arranged at an outer circumference of the rings 35.

Further, inner surfaces 66 of the small through-holes 65 are covered with electrically conducting material, and connections 33, 37 are arranged between the electrically conducting material of the small through-holes 65 and the portions 63, 64 of electrically conducting material which are present on the end surfaces 11, 12.

The electrically conducting material may be applied by means of any suitable technique. In the process, it is possible that the entire surface of the electrically insulating body 60 is initially covered with electrically conducting material, wherein portions of the electrically conducting material are removed at a later stage in order to obtain the desired pattern of electrically conducting material.

A further step of the manufacturing process is aimed at attaching a substantial portion of spacers 45 to a surface of the second electrodes 22, preferably by means of soldering. Preferably, a bothersome method of attaching spacers 45 individually is avoided. Instead, it is possible to apply a carrier (not shown in any of the figures) carrying the spacers 45, wherein the entirety of the carrier and the spacers 45 is partially attached to the surface of the second electrodes 22, via the spacers 45, and wherein the carrier is subsequently removed. For example, an aluminium sheet is applied as a carrier, wherein the spacers 45 comprise nickel/copper. The entirety of aluminium sheet and nickel/copper spacers 45 is soldered to the second electrodes 22, via the spacers 45. At a later stage of the manufacturing process, the aluminium is removed, for example by means of etching.

The entirety of carrier and spacers 45 may initially be flat, wherein this entirety is processed by means of a forging tool in order to provide the spacers 45 with the three-dimensional structure or stepped structure which contributes to the flexibility of the spacers 45. After the spacers 45 have assumed their intended shape, the entirety of carrier and spacers 45 is ready to be connected to the electrically insulating body 60. During a still further step of the manufacturing process, an electrically insulating layer 25 is applied, at least to the portion of the first electrodes 21 covering the inner surface 17 of the large through-holes 14 and to the under portion of the spacer 45. The electrically insulating layer 25 comprises electrically insulating material, for example a dielectric such as parylene.

In the process of applying the electrically insulating material, the surfaces which do not need to be covered by this material may be temporarily screened in order to avoid that the electrically insulating material is applied to these surfaces, for example by means of removable tape. Another option is to simply perform the process of applying electrically insulating material to the electrically insulating body 60, and afterwards remove parts of the electrically insulating layer 25 obtained.

During a still further step of the manufacturing process, the second cover plate 42 is attached to the second end surface 12 of the electrically insulating body 60, preferably by means of soldering, as has already been remarked in the foregoing.

Within the scope of the present invention, during the manufacturing process it is possible to provide each large through-hole 14 of the electrically insulating body 60 with a separate second cover plate 42, but it is also possible to attach a sheet to the first electrodes 21, which sheet is divided into separate cover plates during a last step of the manufacturing process, in which the electrically insulating body 60 is divided into separate portions.

During a still further step of the manufacturing process, the electrically insulating layer 25 is covered with a hydrophobic material, whereby the fluid contact layer 28 is obtained.

During a still further step of the manufacturing process, the first cover plate 41 is attached to an upper side of the spacer 45. Like the second cover plate 42, the first cover plate 41 may comprise a metal ring, so that it is possible to connect the first cover plate 41 to the spacer 45 by means of soldering. Furthermore, it is possible to provide each large through-hole 14 of the electrically insulating body 60 with a separate first cover plate 41, but it is also possible to attach a sheet to the spacers 45, which sheet is divided into separate cover plates during the step in which the electrically insulating body 60 is divided into separate portions.

After both cover plates 41, 42 have been attached, delimited spaces are obtained, which constitute the fluid chambers 50 of the lenses 1 to be manufactured. During a still further step of the manufacturing process, the fluid chambers 50 are filled with the fluids 51, 52. As has already been described in the foregoing, the spacers 45 are only partially attached to the second electrodes 22. The connection between each spacer 45 and the associated second electrode 22 is interrupted in the vicinity of the bulge 38 of the second electrode 22, such that fluid is able to flow freely from the bulge 38 into the fluid chamber 50. Thus, the fluid chamber 50 is filled with the fluids 51, 52 by pouring the fluids 51, 52 on the bulge 38 and letting them flow inside the fluid chamber 50 through an open space in the connection between the spacer 45 and the second electrode 22.

It will be understood that the step of the manufacturing process as described in the preceding paragraph is followed by a still further step during which the connection between the spacer 45 and the second electrode 22 is completed, so that the fluid chamber 50 is completely sealed and it is not possible for the fluids 51, 52 to leave the fluid chamber 50. For the purpose of closing the connection, ultrasonic connection techniques known per se may for example be applied.

After the step of completely sealing the fluid chamber 50 has been completed, the electrically insulating body 60 may be regarded as a collection of lenses 1, wherein the lenses 1 are attached to each other along their circumferential surfaces 16. In order to obtain separate lenses 1, a final step of the manufacturing process is performed, in which the electrically insulating body 60 is divided. In the process, the electrically insulating body 60 is separated into individual lenses 1 over lines of separation, two of which are diagrammatically depicted in FIG. 5 by means of dashed lines 68. The lines of separation 68 run through the small through-holes 65, and extend in two directions, which are at right angles with respect to each other. Any suitable separation technique may be applied for the purpose of the division of the electrically insulating body 60 into separate lenses 1.

It should be understood that the above-described way of carrying out the method according to the present invention is only to be regarded as an example. The invention encompasses all processes for manufacturing variable focus lenses such as the lens 1 shown, i.e. lenses comprising two electrodes 21, 22 and a fluid chamber 50 filled with two fluids 51, 52 which are separated by a meniscus, wherein the shape of the meniscus is variable under the influence of a voltage, in which the lenses are manufactured from an electrically insulating body 60 comprising a plurality of through-holes 14 which are intended to constitute the through-holes 14 of individual lenses, which electrically insulating body 60 is divided after the electrodes 21, 22 and at least electrically insulating layers 25 have been applied, and the through-holes 14 have been sealed and filled with the fluids 51, 52.

The steps of the manufacturing process are related to the design of the lens to be manufactured. For example, within the scope of the present invention, it is possible that the lens comprises two spacers 45, wherein one spacer 45 is arranged between the first cover plate 41 and the second electrode 22, and wherein another spacer 45 is arranged between the second cover plate 42 and the first electrode 21. Naturally, in order to manufacture such a lens having two spacers 45, the manufacturing process does not only comprise a step of attaching spacers 45 to the second electrodes 22, at the side of the first end surface 11 of the electrically insulating body 60, like the above-described manufacturing process, but also comprises a step of attaching spacers 45 to the first electrodes 21, at the side of the second end surface 12 of the electrically insulating body 60.

Preferably, during the method according to the present invention all connections between elements of the lens 1 are realized by means of connection techniques which are aimed at forming gastight and fluidtight connections. Such connection techniques comprise soldering and welding techniques. If other connection techniques are applied wherein for example glue or O-rings are used for the purpose of realizing a connection, the connections obtained are not entirely gastight or fluidtight. As a result, in the long term, air bubbles may appear in the fluid chamber 50, which affect the operation of the lens 1.

The lenses 1 may be applied in hand-held apparatus, such as mobile phones and optical scanning devices for use in digital recording equipment.

A number of lenses 1 may be positioned in a row, wherein the through-holes 14 of the lenses 1 are aligned with respect to each other, in order to create a zoom lens. A lens assembly 3 comprising three lenses 1, which is capable of performing a zooming function, is diagrammatically shown in FIG. 6. In the example shown, the three lenses 1 are placed on a separate carrier substrate 6. However, it is also possible for means for mutual attachment of the lenses 1 to be provided on at least one of the first end surface 11 and second end surface 12 of the electrically insulating member 10 of the lenses 1, so that a self-supporting lens assembly 3 may be obtained.

Zoom lenses and the way in which they function are further described in the non-prepublished European patent applications EP 02079473.1 and EP 02075649.0, which are included herein by reference.

The lenses 1 are usually applied in a camera, which further comprises an image sensor and an interconnecting body, wherein the interconnecting body comprises electrically conductive tracks arranged on a first surface and a second surface of the interconnecting body, and wherein the electrically conductive tracks are shaped such as to be able to establish a connection between both the image sensor and the variable focus lens or the lens assembly to driver electronics therefore, or to contact pads. In this respect, it is noted that a camera having a lens, an image sensor and an interconnecting body is a possible embodiment of an invention as disclosed in non-prepublished European patent application EP 02078209.0, which is included herein by reference.

The camera may be part of the above-mentioned hand-held apparatus, which may further comprise input means, information processing means and display means.

Preferably, for the purpose of the application in hand-held apparatus, the dimensions of the lens 1 are relatively small. For example, a suitable value for a distance between the first end surface 11 and the second end surface 12 is 2.5 mm, a suitable value for a diameter of the through-hole 14 is 4.0 mm, and a suitable value for a distance between two opposite flat surfaces 15 is 6.5 mm.

Within the scope of the present invention, details of the design of the variable focus lens may deviate from the details as disclosed in the foregoing in relation to the lens 1, which is shown in FIGS. 1 and 2.

For example, the shape of the electrodes 21, 22 may be different, as well as the location of the electrodes 21, 22 on the electrically insulating member 10. For example, the extent to which the electrodes 21, 22 cover the first end surface 11 and the second end surface 12 of the electrically insulating member 10 is variable.

In a second preferred embodiment of the variable focus lens according to the invention, a part of which is shown in FIG. 7, the first end surface 11 of the electrically insulating member 10 is only covered by the second electrode 22. In this embodiment, the first electrode 21 only covers the inner surface 17 of the electrically insulating member 10 defining the through-hole 14, a part of the second end surface 12, and one concave surface 16.

Advantageously, in the manufacturing process of the lens according to the second preferred embodiment, an electrically insulating body 60 is applied, wherein the surface of the body 60 is covered by electrically conducting material, and wherein portions of the electrically conducting material covering the end surfaces 11, 12 and the inner surface 17 of a large through-hole 14 are continuous. In one step of the manufacturing process, the continuous portions are interrupted by inserting a rotating conical tool in the through-holes 14 at the side of the first end surface 11, wherein the electrically conducting material is removed from the location of the transition between the inner surface 17 and the first end surface 11 as soon as it is contacted by the tool. In this way, the two separate electrodes 21, 22 of the lenses are obtained, wherein the electrodes 21, 22 are separated by means of an uncovered part 39 of the surface of the electrically insulating body 60 shaped as a ring, which is present at the transition between the inner surface 17 and the first end surface 11.

The electrodes 21, 22 of the variable focus lens according to the present invention may have any suitable shape and location on the electrically insulating member 10, as long as it is possible to apply a voltage by means of the electrodes 21, 22 in such a way that the shape of the meniscus 53 between the first fluid 51 and the second fluid 52 is varied.

It is not necessary for both the first electrode 21 and the second electrode 22 to extend to the circumferential surface 13 of the electrically insulating member 10. However, in embodiments of the lens according to the present invention, in which the electrodes 21, 22 do extend to the circumferential surface 13, for example to concave surfaces 16 as shown, it is possible to contact the electrodes 21, 22 at the circumferential surface 13. An important advantage of this possibility is that the end surfaces 11, 12 may be completely covered by the cover plates 41, 42, so that, during the manufacturing process, the cover plates 41, 42 can be formed by attaching a single sheet to electrically insulating body 60, and dividing this sheet during the last step of the manufacturing process.

The cover plates 41, 42 do not necessarily need to be entirely transparent. It is important for the cover plates 41, 42 to be capable of letting through light to and from the through-hole 14.

The cover plates 41, 42 may comprise another material than glass, for example a polymer material. The cover plates 41, 42 may comprise several layers, wherein each layer may comprise a different material, and may have other dimensions than an adjacent layer.

Preferably, the through-hole 14 is shaped as a cylinder having a circular transverse section. This is preferable with a view to the process of forming the through-hole 14, and also the optical properties of the lens. However, this does not alter the fact that the through-hole 14 may have another shape. Furthermore, the circumference of the lens according to the present invention may also have an alternative shape. Preferably, the circumference is rectangular, so that the lenses may be formed on the basis of the electrically insulating body 60 by dividing the body 60 over straight lines of separation 68. Nevertheless, the circumference may have any other suitable shape, and may for example be circular.

The small through-holes 65 of the electrically insulating body 60 may be shaped as a cylinder having a circular transverse section. This is not essential; the small through-holes 65 may have another suitable shape.

It is not necessary for the spacer 45 to comprise electrically conducting material. For example, in a design in which the fluid chamber 50 is partially delimited by the second electrode 22, wherein the second electrode 22 is not covered by any layer 25, 28, direct contact between the second electrode 22 and the second fluid 52 may be established, so that there is no need for the second electrode 22 to be functionally elongated.

During the manufacturing process, the fluid chamber 50 may be filled with the fluids 51, 52 in a different manner than described in the foregoing. In other words, it is not necessary for the fluids 51, 52 to be provided through an open space in the connection between the spacer 45 and the second electrode 22. Furthermore, it is not necessary for the second electrode 22 to comprise a bulge 38 at the first end surface 11, which plays a role in the filling process described.

In FIG. 8, an electrically insulating member 10 of a lens according to the present invention is shown, as well as a hollow insert 18 which is positioned inside the through-hole 14 and attached to the electrically insulating member 10. In the example as shown, an inner surface 19 of the insert 18 tapers in a direction going from the first end surface 11 to the second end surface 12.

The application of an insert 18 is not necessary. However, in cases where the applied material of the electrically insulating body 60 causes the surface of the electrically insulating body 60 to be relatively rough, it is beneficial to use the insert 18. In such cases, a smooth surface for receiving the layers to be laid down is obtained by means of the insert 18. In this respect it is noted, that it is also possible to obtain a smooth surface by providing the rough surface with a suitable layer, other than the electrically conducting layer which is part of the first electrode 21.

The inner surface 19 of the insert 18 may taper, as is shown in FIG. 8, but this is not necessary. For example, an inner diameter of the insert 18 may be a constant, or the inner surface 19 of the insert 18 may have a stepped appearance. It should be noted that the inner surface 17 of the electrically insulating member 10 defining the through-hole 14 may also taper or have a stepped appearance, especially in cases where no use is made of an insert 18. In lenses in which the inner surface 19 of the insert 18 or the inner surface 17 defining the through-hole 14 is tapered or stepped, the shape of the meniscus 53 is influenced in a way that is beneficial to the optical properties of the lens.

It will be clear to a person skilled in the art that the scope of the present invention is not limited to the examples discussed in the foregoing, but that several amendments and modifications thereof are possible without deviating from the scope of the present invention as defined in the attached claims.

In the following, a few important aspects of the present invention are listed. According to a first important aspect, during the manufacturing process of the variable focus lens, a carrier carrying a plurality of spacers 45 is provided, wherein the entirety of the carrier and the spacers 45 is attached to the electrically insulating body 60, via the spacers 45, after which the carrier is removed.

According to a second important aspect, during the manufacturing process of the variable focus lens, inserts 18 are positioned inside the large through-holes 14 and attached to the electrically insulating body 60, wherein a surface of the inserts 18 is covered with a part of the electrically conducting material.

According to a third important aspect, inner surfaces 17, 66 defining both the large through-holes 14 and the small through-holes 65 in the electrically insulating body 60 are at least partly covered with electrically conducting material; and electrically conducting material is arranged on both the first end surface 11 and the second end surface 12; wherein at least a part 35 of each portion of the electrically conducting material arranged on the first end surface 11 encompasses a first end of a large through-hole 14, while being separated from the electrically conducting material of said through-hole 14 on the one hand, and while being in contact with the electrically conducting material of an adjacent small through-hole 65 on the other hand; and wherein each portion of the electrically conducting material arranged on the second end surface 12 is in contact with the electrically conducting material of both a large through-hole 14 and an adjacent small through-hole 65.

According to a fourth important aspect the large through-holes 14 in the electrically insulating body 60 are shaped as a cylinder having a circular transverse section.

According to a fifth important aspect the small through-holes 65 in the electrically insulating body 60 are shaped as a cylinder having a circular transverse section.

According to a sixth important aspect the electrically insulating body 60 comprises a polymer resin material.

According to a seventh important aspect a part of the first electrode 21 in the variable focus lens is arranged on the second end surface 12 of the electrically insulating member 10.

According to an eighth important aspect at least one of the covers 41, 42, 45 of the variable focus lens comprises a rigid cover plate 41, 42 and a flexible spacer 45, wherein the spacer 45 is connected to the electrically insulating member 10, preferably through the second electrode 22, and wherein the cover plate 41, 42 is connected to the spacer 45.

According to a ninth important aspect the spacer 45 in the variable focus lens comprises a foil having a three-dimensional structure or a stepped structure which contributes to the flexibility of the spacer 45.

According to a tenth important aspect the through-hole 14 in the variable focus lens is shaped as a cylinder having a circular transverse section.

According to an eleventh important aspect an inner surface 19 of the insert 18 in the variable focus lens tapers in a direction going from the first end surface 11 to the second end surface 12 of the electrically insulating member 10.

According to a twelfth important aspect at least one of the cover plates 41, 42 of the lens 1 in the variable focus lens is shaped as a lens, i.e. at least one of the cover plates 41, 42 comprises a convex or a concave surface.

The invention claimed is:

1. Method of manufacturing a collection of n separate variable focus lenses, wherein n≧2 and each variable focus lens comprise the following components:
    an electrically insulating member in which a through-hole is arranged for providing a light path through the electrically insulating member, which through-hole is sealed by means of covers which are optically transparent in the light path;
    a fluid chamber which is enclosed by an inner surface of the through-hole and the covers, and which is filled with a first fluid and a second fluid (52), which are non-miscible, and which are in contact over a meniscus; and
    a first electrode and a second electrode, wherein a shape of the meniscus is variable under the application of a voltage between the first electrode and the second electrode;
  the method comprising the following steps:
    providing an electrically insulating body, which is provided with at least n through-holes, wherein a part of a surface of the electrically insulating body is covered with electrically conducting material;
    covering a part of the electrically conducting material with an electrically insulating material;
    partially sealing n through-holes;
    filling the n partially sealed through-holes with the first fluid and the second fluid;
    completely sealing the n through-holes; and
    dividing the electrically insulating body into n portions.

2. Method according to claim 1, wherein the electrically insulating body comprises n+z through-holes;
    wherein at least a part of an inner surface of each of z through-holes is covered by the electrically conducting material; and
    wherein the z through-holes are divided into at least two hole portions when the step of dividing the electrically insulating body into n portions is performed.

3. Method according to claim 1, wherein the covers are at least partially flexible.

4. Method according to claims 1, wherein at least an inner surface of the n through-holes is covered with a hydrophobic material.

5. Method according to any one of claims 1-4, wherein the n through-holes are sealed in a gastight and fluidtight manner.

6. Array of n variable focus lenses obtained by the steps of the method according to claim 1, except the step during which the electrically insulating body is divided into n portions.

7. Electrically insulating body for use in a method of manufacturing a collection of n separate variable focus lenses, wherein n≧2, comprising a first end surface, an opposite second end surface and a plurality of through-holes extending between the first end surface and the second end surface, wherein two groups of through-holes are distinguishable, wherein a diameter of through-holes belonging to a first group is larger than a diameter of through-holes belonging to a second group, wherein inner surfaces defining both the through-holes belonging to the first group and the through-holes belonging to the second group are at least partly covered with electrically conducting material; and wherein the electrically conducting material covering a through-hole (65) belonging to the second group is in contact with the electrically conducting material covering an adjacent through-hole (14) belonging to the first group.

8. Variable focus lens, comprising:

an electrically insulating member, which has a first end surface (11), an opposite second end surface and a circumferential surface extending between the first end surface and the second end surface, and which is provided with a through-hole extending between the first end surface and the second end surface for providing a light path through the electrically insulating member;

covers sealing both ends of the through-hole;

an electrically insulating fluid and an electrically conducting fluid, which are contained by a fluid chamber enclosed by the covers and an inner surface of the electrically insulating member defining the through-hole, which are non-miscible, and which are in contact over a meniscus;

a first electrode;

an electrically insulating layer separating the first electrode from the electrically conducting fluid; and a second electrode, which is in contact with the electrically conducting fluid;

wherein a shape of the meniscus is variable under the application of a voltage between the first electrode and the second electrode;

wherein at least a part of the first electrode is arranged on the inner surface of the electrically insulating member; and wherein at least a part of the second electrode is arranged on the first end surface of the electrically insulating member.

9. Variable focus lens according to claim 8, wherein a part of at least one of the first electrode and the second electrode is arranged on a part of the circumferential surface of the electrically insulating member.

10. Variable focus lens according to claim 9, wherein a part of the circumferential surface of the electrically insulating member on which a part of at least one of the first electrode and the second electrode is arranged is shaped as a part of a surface defining a through-hole.

11. Variable focus lens according to claim 9, wherein a part of the circumferential surface of the electrically insulating member on which a part of at least one of the first electrode and the second electrode is arranged is shaped as a quarter of a surface defining a through-hole which is shaped as a cylinder having a circular transverse section.

12. Variable focus lens according to claim 8, wherein a part of the first electrode is arranged on the first end surface of the electrically insulating member, and wherein the part of the second electrode arranged on the first end surface of the electrically insulating member encompasses said part of the first electrode arranged on the first end surface of the electrically insulating member.

13. Variable focus lens according to claim 8, wherein the covers are partly flexible.

14. Variable focus lens according to claim 8, further comprising a hollow insert which is positioned inside the through-hole, and which is attached to the electrically insulating member.

15. Lens assembly functioning as a zoom lens, comprising at least two variable focus lenses according to claim 8, wherein the through-holes of the variable focus lenses are aligned with respect to each other.

16. Camera comprising a variable focus lens according to claim 8 or a lens assembly according to claim 15.

17. Camera according to claim 16, further comprising an image sensor and an interconnecting body, wherein the interconnecting body comprises electrically conductive tracks arranged on a first surface and a second surface of the interconnecting body, and wherein the electrically conductive tracks are shaped such as to be able to establish a connection between both the image sensor and the variable focus lens or the lens assembly to driver electronics therefore or to contact pads.

18. Hand-held apparatus comprising a camera according to claim 16, and further comprising input means, information processing means and display means.

19. Optical scanning device for scanning a record carrier, comprising a variable focus lens according to claim 8.

* * * * *